April 2, 1935.  G. F. COX  1,996,325
SEWAGE DISPOSAL FOR PUBLIC CARRIERS
Filed Jan. 28, 1932  4 Sheets-Sheet 2
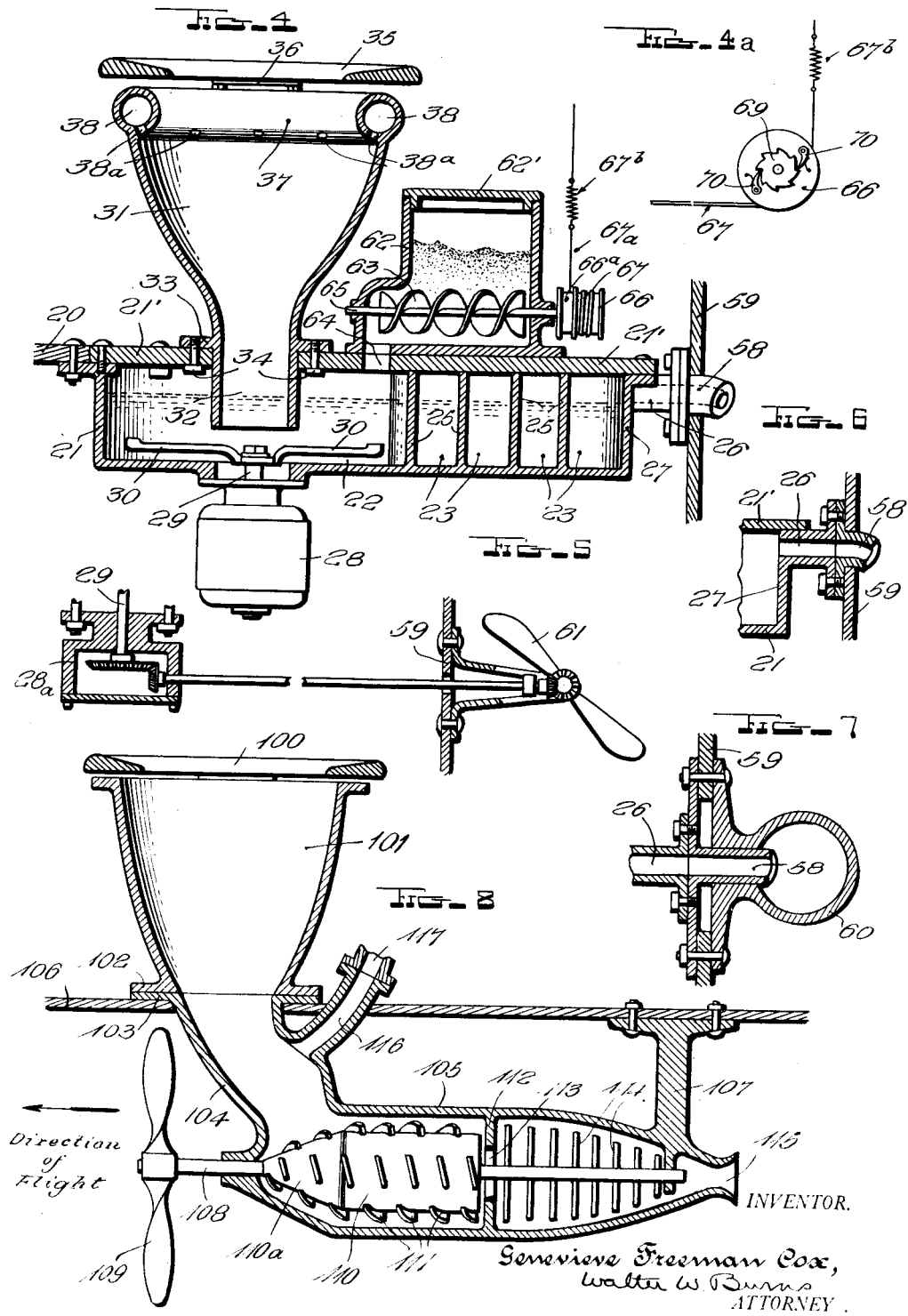
INVENTOR.
Genevieve Freeman Cox,
Walter W. Burns
ATTORNEY.

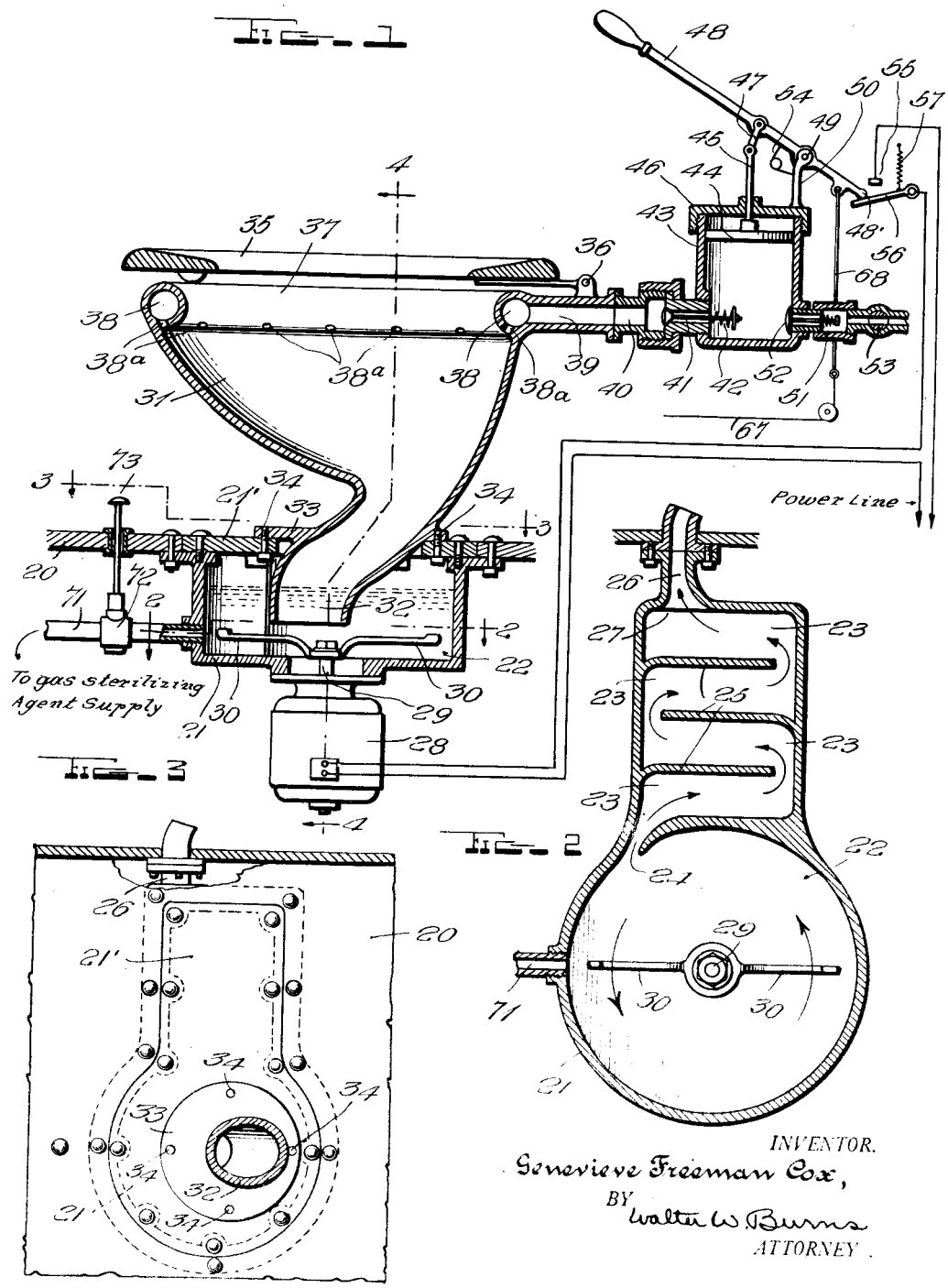

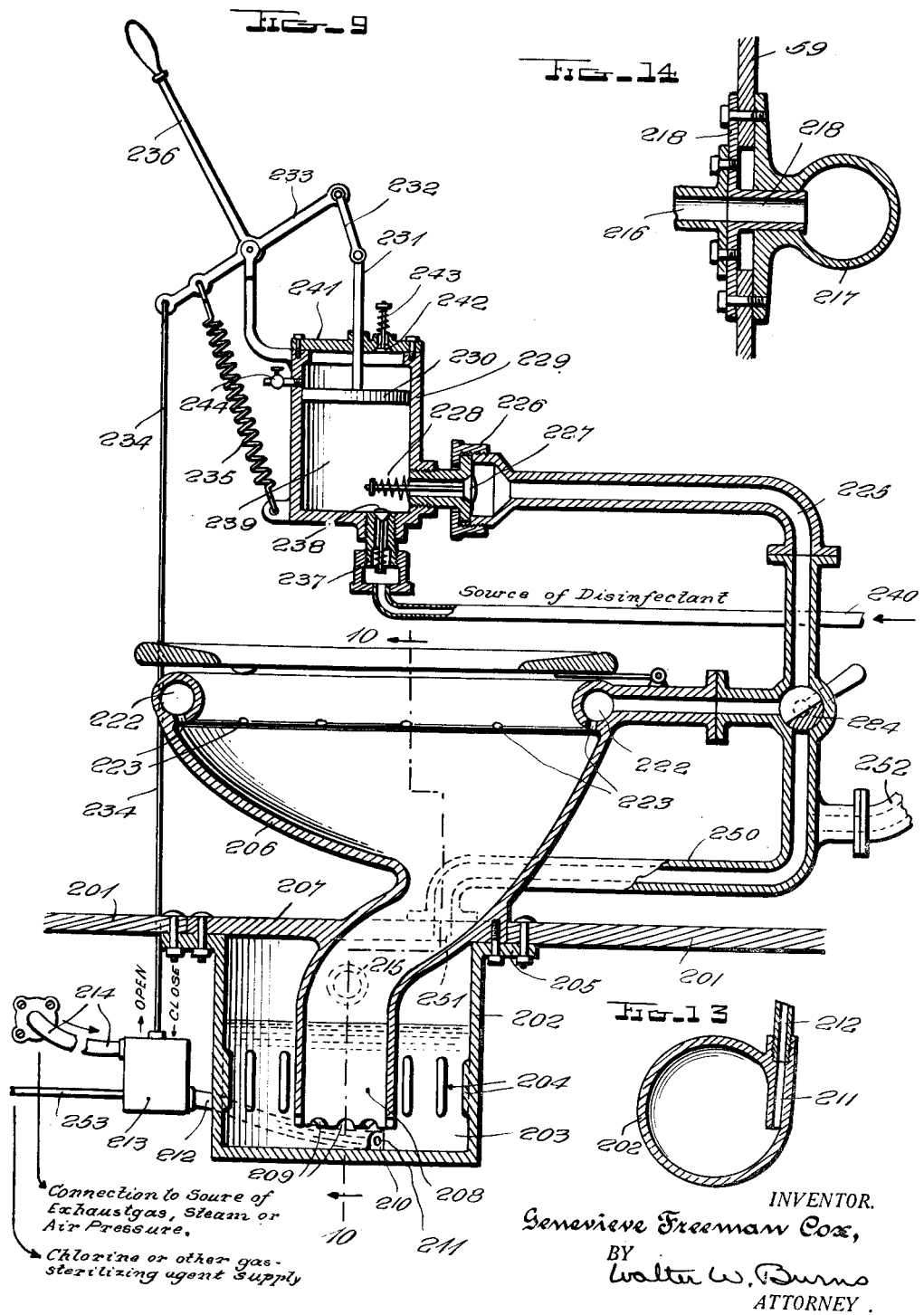

April 2, 1935. G. F. COX 1,996,325
SEWAGE DISPOSAL FOR PUBLIC CARRIERS
Filed Jan. 28, 1932 4 Sheets-Sheet 4
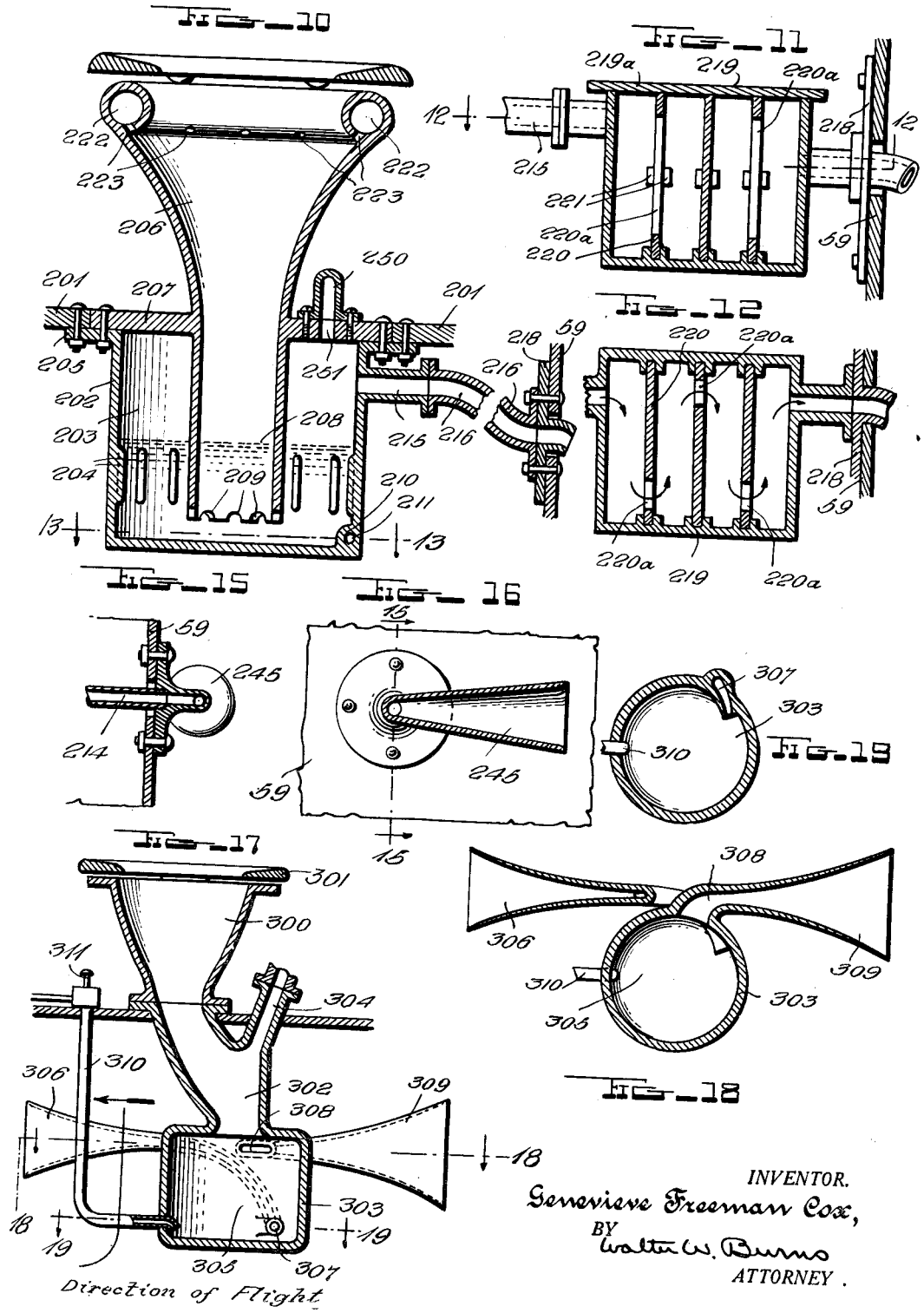
INVENTOR.
Genevieve Freeman Cox,
BY
Walter W. Burns
ATTORNEY.

Patented Apr. 2, 1935

1,996,325

UNITED STATES PATENT OFFICE 1,996,325

SEWAGE DISPOSAL FOR PUBLIC CARRIERS

Genevieve Freeman Cox, Elizabeth, N. J.

Application January 28, 1932, Serial No. 589,504

29 Claims. (Cl. 4—131)

This invention relates to the disposal of sewage and particularly to that class of sewage which must be disposed of from passenger carrying vehicles, as for example, airplanes, busses and railway trains.

It has been and is now the custom to discharge excrement from airplane and other public carrier toilets into the air. This causes the widespread distribution of dangerous bacteria and the consequent endangering of the public health.

In the effective disposal of sewage from passenger carrying vehicles, it is not only essential that the disposal take place gradually so as to distribute the sewage over a comparatively large area but it is also essential that the sewage be, when discharged, both in relatively small particles and harmless from a bacteriological standpoint.

The primary object of this invention is the provision of an improved method of and means for the disposal of sewage which will be adapted for use in vehicles carrying persons.

Another object of the invention is the provision of such a method and means as will dispose of the sewage in small quantities.

A further object of the invention is the provision of such a method and means as will reduce the sewage to small particles before discharge.

A still further object of the invention is the provision of such a method and means as will render the sewage bacteriologically harmless before the same is discharged from the vehicle.

Another and still further object of the invention is the provision of a means for agitating the sewage to assist in breaking it up into small particles and to permit it to be more readily and quickly sterilized.

Another and still further object of the invention is the retention of the sewage in a chamber, for a time after it has been thoroughly broken up so that the sterilizing agent may be placed in more intimate contact with the small particles throughout the entire mass and for a longer time.

Another and still further object of the invention is the provision for mechanical stirring or agitating the sewage to more effectively and quickly break it up into small particles.

Another and still further object of the invention is the provision of a revolving means to break up the solid portions in the liquid to permit the sterilizing agent within the fluid to come into more intimate contact with the particles of matter to be sterilized.

Another and still further object of the invention is the provision for agitation of the sewage by means of gaseous means as by exhaust gas, air pressure or steam, depending upon what agencies are at hand.

Another and still further object of the invention is the provision of a gas steam or air jet to discharge its gaseous fluid on a tangent of the inner wall of an agitating chamber to cause the contents to revolve thereby assisting in the breaking-up process within the agitating chamber.

Other and further objects will be apparent to those skilled in the art from a reading of the complete specification and claims.

Referring to the drawings wherein I have illustrated embodiments of my invention.

Figure 1 is a vertical cross section of a form of my invention wherein there is a mechanical agitation which is motor driven.

Figure 2 is a cross section on the line 2—2 of Figure 1.

Figure 3 is a cross section on the line 3—3 of Figure 1.

Figure 4 is a cross section on the line 4—4 of Figure 1.

Figure 4ª is a side view of the feeding mechanism for the screw feeder 63, shown in Figure 4.

Figure 5 is an elevation of a drive mechanism for the agitator using the relative air velocity of the vehicle to furnish the power through a propeller.

Figure 6 is a detail cross section of the discharge fitting.

Figure 7 is a detail cross section of the discharge fitting when used in connection with the exhaust pipe of an internal combustion motor.

Figure 8 is a modified form of the invention.

Figure 9 is a diagrammatic view shown mostly in section, illustrating a modified form of the invention using a gaseous fluid as a means for producing agitation.

Figure 10 is a cross-sectional view on the line 10—10 of Figure 9.

Figures 11 and 12 are vertical and horizontal views respectively of a detail of my invention.

Figure 13 is a cross section on the line 13—13 of Figure 10.

Figure 14 is a cross sectional detail view of the connection to an internal combustion engine exhaust.

Figures 15 and 16 are detail views of a device for operating an air jet as on airplanes.

Figure 17 is a vertical cross section of another modification using the pressure and exhaust created by the movement of a vehicle such as an airplane and also showing a gas sterilizing means.

Figures 18 and 19 are cross sections on the lines 18—18 and 19—19, respectively of Figure 17.

Referring particularly to Figures 1 to 4, 20 designates the floor of a toilet compartment in a vehicle such as an airplane.

In carrying out my invention by the form illustrated in Figures 1 to 4, I have provided a main body member 21 having an agitation chamber 22 and a second chamber which is illustrated by the long passage 23. A narrow gateway or port 24 connects the chamber 22 with the chamber 23. The wings or vanes 25 act to direct the sewage so that none of the sewage which has just been discharged from the chamber 22 can immediately be discharged. At the opposite end of the chamber 23 from the port 24, is a discharge port 26 which has an overflow wall 27 at a proper height to control the level of the sewage in the chamber 23 and to maintain the desired height of overflow.

The body member 21 is provided at a suitable point, here shown as the bottom, with an opening under which is secured a motor 28 having a driving shaft 29 and a beater or agitating arm 30 mounted on the shaft. The main body 21 has its cover or top plate 21' which covers the chambers 22, 23 and provides a support for the closet bowl to be described.

A closet bowl 31 is provided with a discharge neck 32 which extends through a suitable opening in the cover 21' and as here illustrated at a point over a place slightly off the center of the agitator arm 30.

The flange 33 is provided on the neck 32 to provide a support for the closet bowl 30 and to provide a securing means to give rigidity between the cover member 21' and the closet bowl 31.

Suitable bolts 34 are provided to hold the flange 33 in place. It is to be here noted that the lower edge of the neck 32 is at a lower level than the upper edge of the overflow wall 27. To prevent splashing of the liquid in the neck 32, I preferably make an off-set in the neck as shown in Figure 1.

The closet bowl 31 is provided with the usual seat 35 which may be hinged as at 36. Around the rim 37 of the bowl 31 is a passage 38 having openings 38ª for the delivery of liquid to the interior of the bowl 31. A passage 39 acts as a feeder for the passage 38. In a suitable fitting 40 is a spring pressed valve 41 which is normally kept seated by the spring 42. The fitting 40 is screw threaded in the lower end of a delivery means illustrated as the cylinder 43. Within the cylinder 43 is a piston 44 having an operating rod 45 passing through the cylinder head 46. At the upper end of the rod 45 is a link 47, its upper end being connected to the operating lever 48. The fulcrum of the lever 48 is at the pivot 49 which is secured in the upper end of the bracket 50 which is integral with the head 46.

A suitable fitting 51 having a check valve 52 is provided in the lower end of the cylinder 43. Secured to the fitting 51 is a control valve 53 having a passage connecting the passage of the fitting 51, its other side being connected to a source of liquid (not shown).

The operating lever 48 has an extension 48' beyond its fulcrum and is also provided with a counterbalance spring 54 which has its connection at one end to the bracket 50. This spring 54 is of just sufficient strength to lift the operating lever 48 and the piston 44, rod 45 and link 47. Illustrated diagrammatically for clearness is a switch for closing the circuit to the motor 28. This switch comprises the stationary member 55 and the movable member 56. A suitable spring 57 tends to normally keep the members 55 and 56 in contact. These members 55 and 56 are in series with the electric connections to the current supply. It will be noted that the extension 48' of the operating lever 48 is in position so that when the forward end of the operating lever 48 is raised, the extension 48' will engage the movable switch member 56 and open the switch. This stops the motor.

The disposal of the discharge from the discharge port may be taken care of in any of many ways. It may be discharged directly into the open air as shown at 58 in Figure 4, or the discharge port 26 may deliver the sewage to the interior of the exhaust pipe as shown in Figure 7. In either case, the sewage by the time it passes the discharge port is in the form of liquid containing small particles.

In Figure 7, I have shown the discharge fitting 58, passing through the side 59 of the airplane and into the exhaust pipe 60 of an internal combustion motor.

As a substitute for the motor 28, the gear box 20ª may be substituted with its connections to a small propeller 61 on the outside of an airplane. In this case the relative air velocity drives the agitator. In practice, a suitable clutch with a control to the hand lever 48 may be provided.

I will now describe the operation of my invention. After the closet bowl has been used, the operating lever 48 is pushed downwardly to its limit of movement. This causes the check valve 52 to close and the valve 41 to open against the action of the spring 42. The chamber of the cylinder 43 which was full of a suitable liquid disinfecting chemical, empties its contents through the passage 39, the passage 38, out of the openings 38ª and all along the sides of the bowl 31 and down into the neck 32 to the chamber 22.

But as the operating lever 48 is first moved, the switch 55, 56 is closed, starting the motor 28. This causes the rotation of the agitator and the consequent breaking up of the sewage into small particles within the sterilizing liquid. The centrifugal motion of the fluid caused by the rotation of the agitator arm 30, would naturally have a tendency to immediately force all of the fluid through the port 24 and thence outwardly through the chamber 23 and into the open. However, to offset this, I have so shaped the opening 24 relative to the direction of rotation of the liquid being moved by the arm 30, that there will be a jetting tendency to draw the fluid back from the chamber 23. This tendency with the centrifugal force of the rotating sewage offset each other and produce an equilibrium. The proportion of the parts and the speed and shape of the agitator should be such as to produce this result.

The motor continues to run and the agitating arm to revolve until the switch 55, 56 is opened. The switch 55, 56 remains closed until the extension 48' causes it to open by the return of the arm 48 to its original and normally inoperative position.

As already stated the spring 54 is of just sufficient strength to return the parts to normally inoperative position. The reservoir (not shown) for the disinfecting solution which is connected to the pipe leading to the valve 53, would be so placed as to carry its liquid to the chamber within the cylinder 43, but would usually be without a great pressure. As the operating lever 48 and the piston 44 rise, the disinfecting liquid refills the chamber within the cylinder 43. As the lever 48 reaches its upper position, it opens the switch 55, 56 and the parts are ready for another operation.

To control the time of refilling the chamber within the cylinder 43, the valve 53 is adjusted to the correct position.

In case it is desired to use a dry sterilizing agent in the form of powder or crystals, I have provided a hopper 62 having a top 62' and a screw conveyor 63 adjacent its bottom shown diagrammatically in Figure 4.

A discharge opening 64 empties into the chamber 22, already described. To drive the screw conveyor 633 on its shaft 65, I provide a pulley 66 having a flexible driving band 67 secured at one end to the pulley 66. Its other end is attached to a rod 68 which in turn is attached to the operating lever 48. The pulley 66 is mounted on the shaft 65 to relatively rotate in one direction. To bring about this result, I have a ratchet 69 with dogs 70, as shown in Figure 4ª. The auxiliary pulley 66ª is provided with a small return chain 67ª to return the pulley 66 and the driving band 67 to its initial position. A spring 67ᵇ is provided to furnish the motive power for this return movement.

When the operating handle 48 is pushed downwardly the flexible band 67 is unwound from the pulley 66. By the coaction between the dogs 70 and the ratchet 69, the shaft 65 is turned and a desired amount of dry sterilizing agent is fed from the opening 64 to the interior of the chamber 22. At the same time, the chain 67ª was wound upon the drum 66ª against the action of the spring 67ᵇ. Upon release of the operating handle 48, the spring 67ᵇ will turn the pulleys 66, 66ª in a counter-clockwise direction as shown in Figure 4ª, to the initial or normal position. During this latter movement, the shaft 65 does not turn, due to the lack of coaction between the ratchet 69 and the dogs 70.

If desired, a chlorine or other sterilizing gas supply may be had by a pipe 71 through a valve box 72 whose valve is operated by the foot plunger 73. In this case, the dry sterilizing agent may be omitted and water may be used in the cylinder 43.

In Figure 8, I have illustrated a modification of my invention wherein there is a continuous action.

Referring to Figure 8, 100 designates the seat of the usual closet bowl 101. At the lower end of the bowl 101 is a flange 102 to provide a means for securing the closet bowl to the flange 103 of the delivery pipe 104 which connects to the main body 105 of the disposal unit.

The flanges 102, 103 are secured to the floor 106 of the plane. A strut 107 at the rear end of the main body 105, secures the disposal unit to the outside of the plane fuselage.

Within the main body 105 is a revolving unit comprising a shaft 108 upon the forward end of which is a driving propeller 109 which revolves the shaft whenever the plane is in the air. To the rear of the propeller 109 and within the main body portion 105 is a cylindrical body 110 mounted upon and to revolve with the shaft 108. This cylindrical body 110 has a conical portion 110ª at its forward end at the lower end of the passage leading from the bowl 101. On the outer surfaces of the cylindrical member 110 and the conical portion 110ª are small blades 111 which act as beaters to break up the solid portions of the sewage. These blades may, if desired, be placed slightly at an angle to the normal plane to the axis of rotation, in order to urge the matter within the body member 105 to the rear. It will be noted that the main body member 105 has two compartments divided by the partition 112, which latter has an opening 113 through which the shaft 108 passes.

As the sewage is broken up and urged to the rear, it passes through this opening 113 and comes into contact with the beater prongs 114 which are mounted on the shaft 108. These latter tend to break the sewage into very fine particles before discharge.

At the extreme rear of the main body member 105 is a discharge opening 115 which may be flaring in shape rearwardly in order to give a venturi action to assist in drawing the sewage to the rear and discharge it in small particles.

All of the structure exposed to the wind is preferably made with stream lines to reduce wind resistance.

Extending from the side of the delivery pipe 104 is a supply pipe 116 having a suitable flange 117 for connection to a suitable supply of either liquid or solid sterilizing agent.

In this modification, the shaft 108 turns continuously while the plane is off the ground. The solids and liquids passing down through the delivery pipe 104, come into contact with the blades 111 of the conical portion 110ª and the cylindrical member 110. The solids are reduced by the blades 111 to small particles suspended in the liquid. This permits the sterilizing agent to come into intimate contact with the solid matter and eventually to render the whole sterile.

Under the action of the air pressure from the delivery pipe 104 caused by the suction action at the discharge opening 115 or by the screw action of the blades or both, the mass is urged rearwardly through the opening 113.

The beater prongs 114 act upon and continue to break up the solids into finer particles as they pass toward the discharge opening 115. When further deposits are made through the delivery pipe 104 and pass to the rear, any sewage still in the chamber rearward of the opening 113 will be forced outwardly through the opening 115. As the swift currents of air catch the discharged sewage, it will be broken up into finer particles. When the sewage reaches the air, the drying action of the air begins and under normal conditions, there will be nothing but sterile dust to be deposited on the ground.

If desired to have the shaft 108 operable at will, suitable clutch means may be provided. As these are common in the arts, it is not thought to be necessary to illustrate this feature.

In Figures 9 to 14, I have illustrated another embodiment of my invention wherein I use a gas to provide the means for agitating the sewage.

The numeral 201 designates the floor of the vehicle where the installation is set up. I provide a base or main body member 202 which contains the agitating chamber 203. About the sides of the chamber 203 and adjacent the bottom thereof, are ribs 204 which protrude far enough to assist in the breaking-up action but do not extend out far enough to materially affect the circular movement of the liquid mass as will be described. The body member 202 is substantially cylindrical in shape and is provided with a wide flange 205 at its top.

A closet bowl member 206 is provided with a flange 207 corresponding in shape to the adjacent surface of the flange 205 and is secured thereto by suitable bolts. The bowl or closet member 206 is provided with a neck portion 208 which extends down into the body member 202 and terminates near the bottom.

Near its opening, it is provided in its inner rim with notches 209 which assist in the initial step of the breaking-up process.

Referring particularly to Figures 10 and 13, a boss 210 is provided on the inner surface of the body member 202. This boss 210 has a passage 211 in the form of a jet, the port of which is adjacent the periphery of the bottom of the chamber 203, and is so placed as to point along the tangent of the cylindrical chamber. A pipe 212 is connected to the passage 211 and extends from a suitable valve box 213 illustrated on Figure 9. This valve box 213 is connected from the source of gas pressure by a pipe 214 which may be the exhaust connection of an internal combustion engine, a steam pipe or any other source of gas or air pressure.

The valve box 213 has a suitable valve and valve seat therein to control the passage of gas or air therethrough.

Connected to the upper portion of the body member 202 is an outlet 215 which is the lead-off from the chamber 203. The opening of the outlet 215 may lead to the pipe 216 and to the open air as illustrated or to the exhaust pipe 217 as illustrated in Figure 14. A flanged fitting 218 connects the pipe 216 to the exhaust pipe 217 or conducts the sewage into the open air.

If desired to retain the sewage intact for a time to permit the sterilizing agent to act for a longer period of time before being discharged, a long passage may be provided through which the sewage will pass. A box 219 may be provided with intake and outlet flanged connections similar to those of the pipe 216.

A vertical cross section of such a box is illustrated in Figure 11 and a horizontal cross section of the same is shown in Figure 12. This box is preferably provided with one or more partitions 220. These partitions may be made detachable to slide in place between the lugs 221 which are integral with the box sides. The partitions may be made identical and are provided with openings 220ª. By sliding the partitions into place in inverse alternate positions, a circuitous route for the sewage is provided. As illustrated, the openings 220ª are so placed as to give the movement of the sewage, as it progresses through the box, an alternate side to side movement. The openings may be arranged in any other manner to give the sewage the desired course. The circuitous route for the sewage, prevents the immediate discharge of those portions of the sewage which have just been admitted to the box 219. If it is not desired to discharge all of the solid matter, the box 219 can be made large enough to collect some of the solid matter, the box being serviced at the end of a "run."

After passing out of the box and through the fitting 218, the sewage may be discharged into the open air or into the exhaust pipe 217 to be discharged, as already described. A suitable cover 213ª for the box 219 is provided and may be held in place by screws.

To provide for the admission of the sterilizing agent, the upper edge of the bowl 206 is provided with a passage 222 within the rim as shown in Figure 9. This passage has outlet holes into the bowl which I have designated 223.

The passage 222 has an inlet from a valve 224 which is connected at one side to the duct of the pipe 225. This duct 225 leads from a suitable fitting 226 containing a valve seat and valve 227, which valve is normally held seated by the spring 228.

The fitting 226 is screw threaded into the lower end of the cylinder 229 in which operates the piston 230. The piston rod 231 is connected to a link 232 which in turn is connected to one arm of a bell-crank lever 233. Another arm of the bell-crank lever 233, is connected to a link 234. This link 234 operates the valve in the valve box 213 already described. A spring 235, normally holds the bell-crank lever 233 in the position as illustrated in Figure 9. A handle operating arm 236 is an integral part of the bell-crank lever 233 and is used to cause the operation of the whole device as will be described. A fitting 237 is placed in the bottom of the cylinder 229 and is screw-threaded in its place. This fitting 237 is provided with a small light check valve 238 which prevents any movement of the sterilizing fluid from the chamber 239 of the cylinder 229 into the pipe 240. This pipe 240 leads to a suitable storage tank (not shown) for the storage of the liquid sterilizing agent supply.

At the top of the cylinder 229, I provide a cylinder head 241 which is secured in place with suitable bolts. In the head 241 is a check valve 242 which is normally held seated by the spring 243. This valve 242 is gently held to its valve seat in the head 241 by the spring 243 so that when the piston 231 is moved away from the head, the valve 242 will immediately open to admit air but will close as soon as the piston 230 stops its downward movement and will remain closed during its upward movement.

To control the movement of the air from the space above the piston 230, there is placed in the side of the cylinder 229, a pet-cock 244. By turning this pet-cock 244 on or off, the time of movement of the piston 230 from its lower position to its upper or ready-for-operation position can be controlled.

I will now describe the operation of the modification illustrated particularly in Figures 9 to 14.

After use of the toilet, the handle arm 236 of the bell-crank lever 233 is moved in a clockwise direction as illustrated in Figure 9,—as far as it will go. As the first movement takes place, the fluid within the chamber 239, immediately closes the check valve 238 and pushes the valve 227 against the action of the spring 228, to permit the liquid to pass into the duct of the pipe 225. The liquid passes through the passage of the valve 224 out into the passage 222 of the rim of the closet bowl 206. The fluid passes out of the holes 223 into the bottom or neck 208.

As soon as the movement of the piston 230 is brought about by the movement of the handle arm 236, the valve 242 opens to destroy any tendency of the piston 230 to form a vacuum thereabove which permits free downward movement of the piston 230.

The movement of the handle arm 236 also, through the link 234, opens the valve within the valve box 213 and permits the gas or air pressure to enter the jet 211. When this gas or air emerges from the jet opening into the liquid of the agitating chamber 203, a movement circumferentially of the chamber is set up. As the centrifugal forces operate on the fluid, the latter will rise on the side of the outer surface of the cylinder 202 and a corresponding lowering of the level of the liquid in the neck 208 will result.

Any solid matter in the neck 208 will be drawn into the agitating chamber 203 and at the same time this circular movement will be imparted from the agitating chamber fluid to the fluid within the neck 208 of the bowl 201. As the solid matter reaches the notches 209, the breaking-up action begins to take place. The solid matter then passes to the chamber 203 and as the velocity of the moving fluid increases, more surface of the chamber 202 will be covered. The ribs 204 will be contacted and further breaking-up of the solids will take place. As the solids are broken up, the small particles come into intimate contact with the sterilizing agent and the sterilizing action is assisted.

When exhaust gases from an internal combustion motor are used or where steam is used, it will be noted that a corresponding heating action will take place. This makes it possible to use a sterilizing fluid of lower concentrate, as the heat assists the action of the sterilizing agent. In fact the sterilizing action could be brought about by the steam or hot gas alone if continued long enough.

When the liquid contents of the chamber 203 rises along the surface of the inner wall of the cylindrical body member 202, it will come to the outlet 215 and pass to the pipe 216 or the box 219 as the case may be. If the box 219 is used, the liquids therein are forced through the box as indicated by the arrows. After passing through the pipe 216 or the box 219, the sewage passes through the fitting 218 either to the open air or into the exhaust pipe of the internal combustion motor. In the latter case, the heat would have a tendency to disintegrate and sterilize the particles and evaporates the water.

As soon as the handle arm 236 is released by the operator, the spring 235 tends to return it to its initial position ready for another operation. When the return movement begins, the valve 227 is closed by its spring 228 and the valve 238 is opened. The valve 242 is also closed by the spring 243. The upward movement of the piston 230 tends to compress the air above the piston and a retarding of the movement of the piston results. The escape of the air takes place through the pet-cock 244, which latter may be adjusted to control the movement.

During the upward movement of the piston 230, the chamber 239 is filling with the sterilizing fluid from the pipe 240.

When the handle arm 236 reaches its left position as shown in Figure 9, the rod 234 closes the valve within the valve box 213 and the flow of gas, steam or air is stopped.

The fluid level within the chamber 203 and the neck 208, becomes the same. The parts are now in position for further use and operation.

During operation excess gas or steam or air pressure is prevented by the passage of the gases over the top of the fluid through the box 219 out and to the open air along the same course above described for the sewage.

As the sewage is discharged from the fitting 218, it will be blown into small particles by the relative wind velocity if being used on an airplane. The particles will, before they come to the earth, by thoroughly sterile. It would be preferable to use a sterilizing agent that would quickly become inert when discharged into the atmosphere.

An example of this is caustic soda which when in contact with the air would quickly carbonate. If a sterilizing agent is used which is harmful to the skin, there should be provision for preventing splashing of the liquid. The offset of the neck 208 will produce the desired result.

If any small particles should come into contact with the ground before separating, they will previously have become sterile and can cause no harm. This latter might be the case where the invention might be used on a bus without having the discharge go into the exhaust pipe. In case the discharge is made to the exhaust, the sterilizing action will be assisted and the particles will be mixed with the exhaust gases.

If it is desired to use the jet agitator with air pressure as for example on an airplane, the funnel 245 shown in Figures 15 and 16 may be placed so that its mouth is exposed to the direct action of the air, the funnel being connected to the tube 214 which is connected to the valve box 213.

If a chemical should be used as a sterilizing agent which it was believed might injure the skin and it was found that to pass the agent through the duct 222 would be in danger of contact with the skin, the agent could be made to enter the system without passing it through the rim of the bowl. To provide such entry, I furnish a duct connection 250 from the valve 224 and extending to the opening 251 in the flange 207.

The valve 224 is so constructed that it may cut off the connection to the passage 222 and open a direct passage from the pipe 225 to the duct connection 250.

If desired, a connection 252 to the duct 250 can be made, leading from the lavatory or sink drain pipe from another part of the airplane or other vehicle. In this way, all of the sewage may be made to pass through the same sewage disposal unit.

If found to be desirable, the sterilizing agent may be introduced in the solid form in any suitable manner as for example as described earlier for the structure illustrated in Figure 4.

It is also possible to introduce a gaseous sterilizing agent such as chlorine. A connection for this purpose is illustrated at 253 which is shown as entering the valve box 213. A suitable valve controlled by the valve operating rod 234 admits the chlorine at the same time the gas steam or air is admitted to the tube 212 from the tube 214. The chlorine or other gaseous sterilizing agent would in this arrangement enter the chamber 203 through the duct 211 and would be absorbed by the liquid in the chamber 203.

In Figures 17, 18 and 19, I have illustrated still another form of my invention which it is believed preferable to keep in operation at all times when the airplane or other fast moving vehicle is in motion.

A closet bowl 300 with the seat 301 may be of the usual or any suitable type. The disposal unit as here illustrated is located in the space below the plane in the wind.

The delivery pipe 302 is suitably flanged and is secured to the closet bowl in any suitable or well known manner. At the lower end of the delivery pipe 302 is the main body portion 303, into which the deposits are made.

A duct 304 is provided on the side of the delivery pipe 302 for the purpose of delivering a liquid or solid sterilizing agent to the chamber 305 of the main body portion 303. To provide for the agitation of the liquid and solids, I have provided a wind collecting funnel 306 having an opening on the tangent of the bottom of the periphery of the main body portion 303, which latter is preferably substantially cylindrical. This opening I have designated 307. Air collected by the funnel 306 is delivered to the liquid within the chamber 305. The liquid is caused to revolve rapidly. This action breaks up the solid matter into small particles.

In order to get rid of the air thus forced in, I have provided an outlet 308 larger in area than the inlet 307. To assist in exhausting the air from the interior of the chamber 305, I provide a funnel 309 in the reverse position from the collecting funnel 306 and having a larger mouth. If a very strong suction action is desired at the outlet 308 this effect may be gained by connecting the outlet 308 to an aspirator nozzle operated by another wind collecting funnel of the same diameter or larger diameter than the funnel 306.

During the operation of the device which is continuous, whenever the liquid is raised by centrifugal action or by the receipt of additional deposits, some of the contents will be forced out of the opening 308 and discharged into the open air.

If desired, the main body portion 303 may be between the floor of the compartment and the bottom of the fuselage of a plane. In such a case the funnels would be placed outside to collect and discharge the air, the tubes being led from the respective funnels to the openings 307 and 308. It will be noted that since the throat of the funnel 306 is as high as the opening 308, there will be no undesirable discharge of the contents of the chamber 305 when the vehicle is not in motion.

If desired, a gaseous sterilizing agent as chlorine may be applied to the liquid by a pipe 310 and controlled by a valve knob 311. In the case of the use with chlorine or other gaseous sterilizing agent, it might be found to be desirable to use only water through the passage 304. Or it might be found that it could be operated without inserting any water during a "run" or series of "runs."

In using any of the forms of my invention, it is possible to use suitable closets now on the market making the changes necessary to have them properly secured together and in proper relation.

While I have illustrated and described in detail embodiments of my invention, I desire to have it understood that these descriptions and showings are merely illustrative and that parts may be interchanged in the several forms and that modifications and other changes may be made without departing from the spirit of the invention and within the scope of the appended claims.

Having described my invention, what I claim and desire to secure by Letters Patent is—

1. The method of sewage disposal for public carriers which consists in agitating the sewage in the presence of a sterilizing agent, then permitting it to enter and slowly pass through a long narrow passage and then discharging the same at the opposite end of the passage.

2. The method of sewage disposal for public carriers which consists in agitating the sewage in the presence of a sterilizing agent, then permitting it to enter and slowly pass through a long narrow passage and discharging the same in small quantities at the opposite end of the passage.

3. The method of sewage disposal for public carriers which consists in agitating the sewage in the presence of a sterilizing agent, then permitting it to enter and slowly pass through a long narrow passage then permitting the mixture to be retained for a time to permit the sterilizing agent to act and then discharging the same at the opposite end of the passage.

4. The method of sewage disposal for public carriers which consists in agitating the sewage, then permitting it to enter a long narrow passage, then permitting it to remain at rest in the presence of a sterilizing agent and then discharging the same at the opposite end of the passage.

5. The method of sewage disposal for public carriers which consists in agitating the sewage, then permitting it to enter a long narrow passage, then permitting it to remain in the presence of a sterilizing agent and then discharging the same in small quantities at the opposite end of the passage.

6. The method of sewage disposal for public carriers which consists in agitating the sewage and heating it at the same time then causing it to enter a long narrow passage and then discharging it at the opposite end of the passage.

7. The method of sewage disposal for public carriers which consists in heating and agitating the sewage at the same time, then passing it into a long, narrow retaining chamber and then discharging it.

8. The method of sewage disposal for public carriers which consists in heating and agitating the sewage at the same time, then passing it into a long, narrow retaining chamber, then discharging it into the exhaust pipe of an internal combustion motor.

9. The method of sewage disposal which consists in agitating the sewage in the presence of a sterilizing agent by passing a gas into the mass and then discharging the same.

10. The method of sewage disposal which consists in agitating the sewage by passing a hot gas into the sewage and along one wall of the container, and then discharging the same.

11. The method of sewage disposal which consists in agitating the sewage by passing the exhaust gases of an internal combustion motor into the sewage in the sewage container and then discharging the same into a retainer and then discharging the same from the container.

12. The method of sewage disposal which consists in agitating the sewage in the presence of a sterilizing agent by causing a hot gaseous flow into and below the surface of the sewage and then discharging the sewage.

13. A sewage disposal apparatus for public carriers comprising an agitator chamber to receive the excrement, means for causing the contents of the chamber to be agitated and a long, narrow conduit having an inlet and an outlet for conducting the sewage to the open air, the inlet and outlet being relatively placed to retain the sewage within the passage until other sewage entering causes it to be discharged.

14. A sewage disposal apparatus for public carriers comprising an agitator chamber to receive the excrement, a passage for delivering a sterilizing agent to the bowl, means for causing the contents of the chamber to be agitated and a long, narrow conduit having an inlet and an outlet for conducting the sewage to the open air, the inlet and outlet being relatively placed to retain the sewage within the passage until other sewage entering causes it to be discharged.

15. A sewage disposal apparatus for public carriers comprising a chamber to receive the excrement, a mechanical agitating device for breaking up the excrement into small particles and a long, narrow conduit having an inlet and an outlet for delivering the sewage into the open air, the inlet and outlet being relatively placed to retain the sewage within the passage until other sewage entering causes it to be discharged.

16. A sewage disposal apparatus for public carriers comprising a chamber to receive the excrement, a mechanical agitating device for breaking up the excrement into small particles, an elongated chamber adjacent the receiving chamber to receive the sewage at one end and a passage from the opposite end of the elongated chamber to the open air.

17. A sewage disposal apparatus for public carriers comprising a bowl, a chamber below the bowl to receive the excrement, a jet connection to the chamber below the sewage level, a source of gaseous fluid supply connected to the jet connection and a passage from the chamber to the open air.

18. A sewage disposal apparatus for public carriers comprising a chamber to receive the excrement, a jet connection to the chamber below the sewage level, a conduit for connecting the jet to the hot exhaust gases from an internal combustion motor and a passage leading from the receiving chamber to the open air.

19. A toilet for public carriers comprising a toilet bowl, a chamber to receive the excrement, a jet connection to the chamber below the sewage level, a conduit for connecting the jet to a source of hot gaseous fluid, a relatively long retaining chamber, a connection to deliver the sewage from the receiving chamber to the retaining chamber and a passage from the retaining chamber to the open air.

20. The process of sewage disposal from public carriers which consists in passing the sewage in the presence of a disinfecting agent through an agitation-retention chamber by hydraulic displacement and then discharging it to the atmosphere in an unnoisome and bacteriologically harmless condition.

21. The process of sewage disposal from public carriers which consists in passing the sewage in the presence of a disinfecting agent through an agitation chamber and then through a retention chamber by hydraulic displacement and then discharging it to the atmosphere in an unnoisome and bacteriologically harmless condition.

22. The process of producing from the sewage of public carriers a bacteriologically harmless unnoisome discharge which consists in passing the sewage through an agitation-retention chamber in the presence of a disinfecting agent in a manner which allows the retention of the treated material until bacteriologically harmless and which permits no mixing of untreated material with the treated material, and then discharging into the atmosphere.

23. The process of producing from the sewage of public carriers a bacteriologically harmless unnoisome discharge which consists in passing the sewage through an agitation chamber in the presence of a disinfecting agent and then through a retention chamber in a manner which allows the retention of the treated material until bacteriologically harmless and which permits no mixing of untreated material with the treated material, and then discharging into the atmosphere.

24. The process of producing from the sewage of public carriers a bacteriologically harmless unnoisome discharge which consists in subjecting the sewage to mechanical agitation in the presence of a disinfecting agent and then retaining the material until bacteriologically harmless in a manner which permits no mixing of untreated material with treated material and then discharging into the atmosphere.

25. The process of producing from the sewage of public carriers a bacteriologically harmless unnoisome discharge which consists in subjecting the sewage to gas flow agitation in the presence of a disinfecting agent and then retaining the material until bacteriologically harmless in a manner which permits no mixing of untreated material with treated material and then discharging into the atmosphere.

26. The process of sewage disposal from public carriers which consists in passing the sewage in the presence of a disinfecting agent through an agitation-retention chamber by hydraulic displacement and then discharging it by aspiration to the atmosphere in an unnoisome and bacteriologically harmless condition.

27. The process of sewage disposal from public carriers which consists in passing the sewage in the presence of a disinfecting agent through an agitation chamber and then through a retention chamber by hydraulic displacement and then discharging by aspiration to the atmosphere in an unnoisome and bacteriologically harmless condition.

28. The process of producing from the sewage of public carriers a bacteriologically harmless, unnoisome discharge which consists in passing the sewage through an agitation-retention chamber in the presence of a disinfecting agent in a manner which allows the retention of the material undergoing treatment for the desired time and which permits no mixing of untreated material with material undergoing treatment and then discharging by aspiration to the atmosphere.

29. The process of producing from the sewage of public carriers a bacteriologically harmless unnoisome discharge which consists in passing the sewage through an agitation chamber in the presence of a disinfecting agent and then through a retention chamber in a manner which allows the retention of the material undergoing treatment for the desired time and which permits no mixing of untreated material with material undergoing treatment and then discharging by aspiration to the atmosphere.

GENEVIEVE FREEMAN COX.